United States Patent
Jens et al.

[11] Patent Number: 5,922,222
[45] Date of Patent: Jul. 13, 1999

[54] FORMING FASTENER MOLD CAVITIES BY ELECTRO-DISCHARGE MACHINING

[75] Inventors: Stephen C. Jens, Winchester; Andrew C. Harvey, Waltham, both of Mass.

[73] Assignee: Velcro Industries B.V., Netherlands Antilles

[21] Appl. No.: 08/935,611

[22] Filed: Sep. 23, 1997

[51] Int. Cl.$^6$ .............................. B23H 1/00; B23H 9/00
[52] U.S. Cl. ............................. 219/69.17; 219/69.2
[58] Field of Search .................. 219/69.15, 69.17, 219/69.2; 264/219

[56] References Cited

U.S. PATENT DOCUMENTS

| | | | |
|---|---|---|---|
| 3,027,595 | 4/1962 | Takai et al. | 18/10 |
| 3,312,583 | 4/1967 | Rochlis | 161/62 |
| 3,752,619 | 8/1973 | Menzin et al. | 425/134 |
| 3,758,657 | 9/1973 | Menzin et al. | 264/166 |
| 3,762,000 | 10/1973 | Menzin et al. | 24/204 |
| 4,725,221 | 2/1988 | Blanz | 425/575 |
| 4,751,860 | 6/1988 | Rudnev et al. | 219/69.17 |
| 4,775,310 | 10/1988 | Fischer | 425/308 |
| 4,794,028 | 12/1988 | Fischer | 428/100 |
| 4,860,616 | 8/1989 | Smith | 219/69.2 |
| 4,872,243 | 10/1989 | Fischer | 24/442 |
| 4,894,060 | 1/1990 | Nestegard | 604/391 |
| 4,984,339 | 1/1991 | Provost et al. | 24/452 |
| 5,131,119 | 7/1992 | Murasaki et al. | 24/452 |
| 5,326,612 | 7/1994 | Goulait | 428/100 |
| 5,339,499 | 8/1994 | Kennedy et al. | 24/452 |
| 5,361,462 | 11/1994 | Murasaki | 24/452 |
| 5,461,211 | 10/1995 | Yoshidaa et al. | 219/69.17 |
| 5,637,239 | 6/1997 | Adamski et al. | 219/69.15 |
| 5,637,264 | 6/1997 | Knapp et al. | 264/219 |

*Primary Examiner*—Geoffrey S. Evans
*Attorney, Agent, or Firm*—Fish & Richardson P.C.

[57] ABSTRACT

An apparatus and electro-discharge machining method for making fastener-shaped mold surfaces in mold plates for making a mold for molding a fastener product having an array of fastener elements. An electro-discharge is created between an electrode and a stack of sheet-form blanks of plate material such that material is removed from the blanks to produce mold plates, each mold plate having a series of fastener element-shaped mold surfaces extending inwardly from an outer edge of the plate. Extremely small tip radii (e.g., less than 0.001 inch) can be produced with the invention. Since a multitude of finished mold plates can be formed at once, the invention is extremely cost effective in producing mold plates with accurately-formed mold surfaces.

22 Claims, 5 Drawing Sheets

FORMING FASTENER MOLD CAVITIES BY ELECTRO-DISCHARGE MACHINING

BACKGROUND OF THE INVENTION

This invention relates to forming very small mold cavities for molding small features integral with a base sheet, and has particular application to the production of touch fasteners and the like.

Fastener elements for hook-and-loop touch fasteners may be made as disclosed in Fischer U.S. Pat. No. 4,794,028. In commercial production, a mold roll is formed from a large number of thin, disk-shaped mold plates and spacer plates which are stacked concentrically on a central barrel. At the periphery of the mold plates are cavities for molding the hook elements. Typically, each mold cavity of the plate is formed by wire electro-discharge machining (EDM) methods. Also, the required small wire diameter limits the rate at which the mold plates can be produced.

SUMMARY OF THE INVENTION

We have realized that improvements in the processes for forming fastener elements can be made, especially processes with electro-discharge machining methods.

One aspect of the invention concerns a method of producing mold plates having series of mold surfaces formed at the edges of the plates for molding a product having an array of fastener elements. The method includes stacking flat, sheet-form blanks of plate material together to form a stack of blanks, each sheet-form blank of the stack having an exposed edge. An electrode is provided having an exposed side surface with a multiplicity of longitudinal ribs extending therefrom. Each longitudinal rib has a cross-sectional shape corresponding with the profile shape of a fastener element. The electrode is moved, in a direction parallel to its ribs and in the presence of a voltage differential between the electrode and the blank, along exposed edges of the stacked blanks such that the ribs of the electrode cause material to be removed from the blanks, by electro-discharge machining method, to produce mold plates from the blanks. Each mold plate has a series of fastener element-shaped mold surfaces extending inwardly from an outer edge of the plate.

Certain preferred embodiments of the invention include: cylindrical electrode with ribs extending radially inward from an inner side surface of the electrode for forming mold surfaces in circular mold plates; preferably, the electrode is moved axially in coaxial relation with the axis of the plates.

In some cases, the method includes passing a first electrode through the sheet-form blanks to rough-cut the mold plates, and then passing a second electrode through the rough-cut mold plates to finish-cut the mold plates and the fastener element-shaped mold surfaces.

In certain preferred embodiments, at least 200 mold surfaces at the outer edge of the mold plates are simultaneously formed; preferably, at least 400 mold surfaces are simultaneously formed. Preferably, the thickness of mold plate, as formed, is less than about 0.020 inch.

In other embodiments, the mold surfaces define distal features having end radii of less than about 0.001 inch; preferably, less than about 0.0005 inch.

In another embodiment, moving the electrode forms alignment features in the mold plates, to align the mold surfaces of adjacent plates in a stack. The alignment features can be non-circular.

In cases where the electrode is cylindrical, the side surface of the electrode may be tapered from a first opening of the electrode to a second opening of the electrode, in which the first opening has a diameter larger than the diameter of the mold plates and the second opening has a diameter corresponding to the diameter of the mold plates.

In other embodiments, moving the electrode along the stacked blanks forms an array of cooling holes in the mold plates.

According to another aspect, the invention concerns a method of producing a circular mold plate having a series of mold surfaces formed in and spaced around its peripheral edge for molding a fastener product having an array of fastener elements. The method includes providing a flat, circular, sheet-form blank of plate material having an exposed edge. A cylindrical electrode is provided, the electrode having a series of longitudinal ribs spaced about and extending inwardly from an inner bore of the electrode. Each longitudinal rib has a cross-sectional shape corresponding with the profile shape of a fastener element. The electrode is moved, axially in the presence of a voltage differential between the electrode and the blank, along the exposed edge of the blank such that the ribs of the electrode cause material to be removed from the outer edge of the blank, by electro-discharge machining method. A mold plate is produced from the blank, the mold plate having a series of fastener element-shaped mold surfaces extending inwardly from its peripheral edge.

Certain preferred embodiments of the invention may include one or more of the following features: forming mold surfaces that extend through the thickness of the mold plate; forming mold surfaces on one side of the mold plate that do not extend through the thickness of the mold plate; stacking at least two blanks to form a blank stack and simultaneously forming mold surfaces in all of the blanks in the stack; simultaneously forming at least 200 mold surfaces at the peripheral edge of the mold plate; preferably, at least 400 mold surfaces are simultaneously formed; the thickness of the mold plate, as formed, is less than about 0.020 inch; the mold surfaces define distal features having end radii of less than about 0.001 inch; preferably, less than about 0.0005 inch.

According to another aspect, the invention provides a mold plate, produced from a flat, circular, sheet-form blank of material, having a series of fastener element-shaped mold surfaces around its peripheral edge simultaneously formed by a cylindrical electro-discharge machining electrode. The plate may have any number of the features heretofore described with respect to the methods of the invention.

Other features and advantages will be apparent from the following description and from the claims.

DESCRIPTION OF THE PREFERRED EMBODIMENTS

Figure 1:
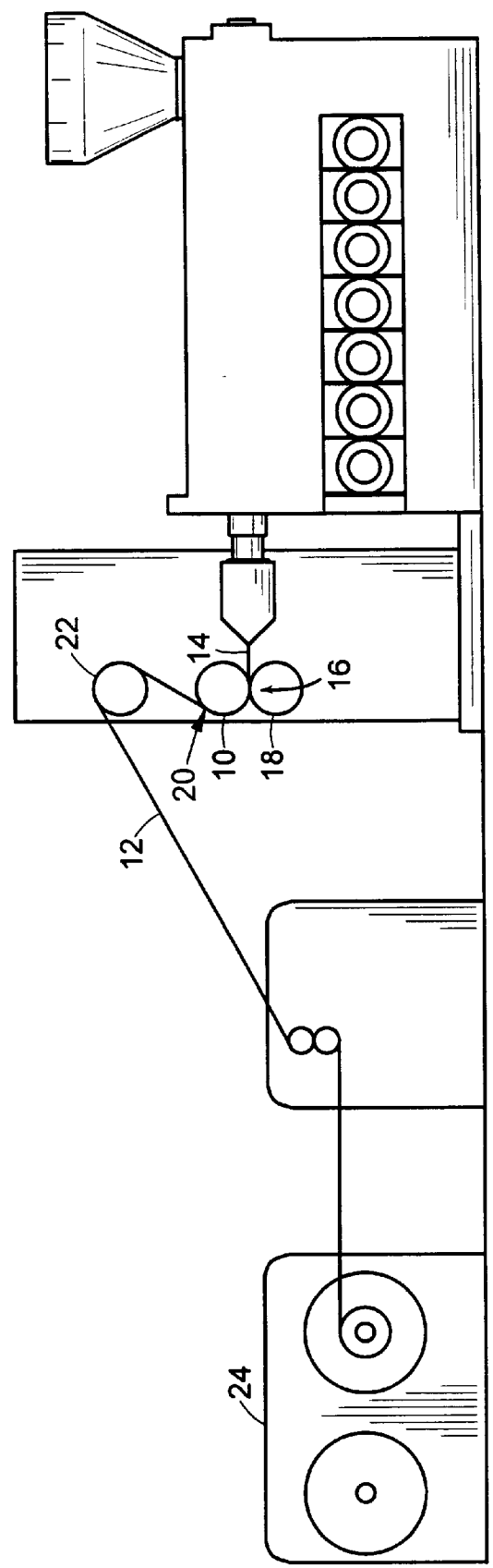
FIG. 1 is a schematic of a molding system employing a mold roll.

FIG. 1 illustrates a molding system using a mold roll for the production of fastener elements for touch fastener products. The process and basic machine shown are as described in U.S. Pat. Nos. 4,775,310, 4,794,028 and 4,872,243.

The mold roll 10 has rows of small fastener shaped mold cavities around the circumference of its outer surface 11 (FIG. 2) for forming fastener projections on a strip-form touch fastener product 12. Mold roll 10 is, e.g., 10 to 12 inches in diameter, and has many round, thin mold plates 26, for instance of 0.004 to 0.020 inch thickness, held together as a stack. Molten synthetic resin 14 is forced into the cavities under pressure at a nip 16, between mold roll 10 and a pressure roll 18. In a continuous process, the fastener projections are pulled from the cavities in area 20 after the projections have cooled and solidified enough to be pulled intact out of their mold cavities, remaining integral with the base sheet of the product. The projections are pulled out of mold roll 10 by passing the product around an idler roll 22 to a takeup assembly 24.

Figure 2:
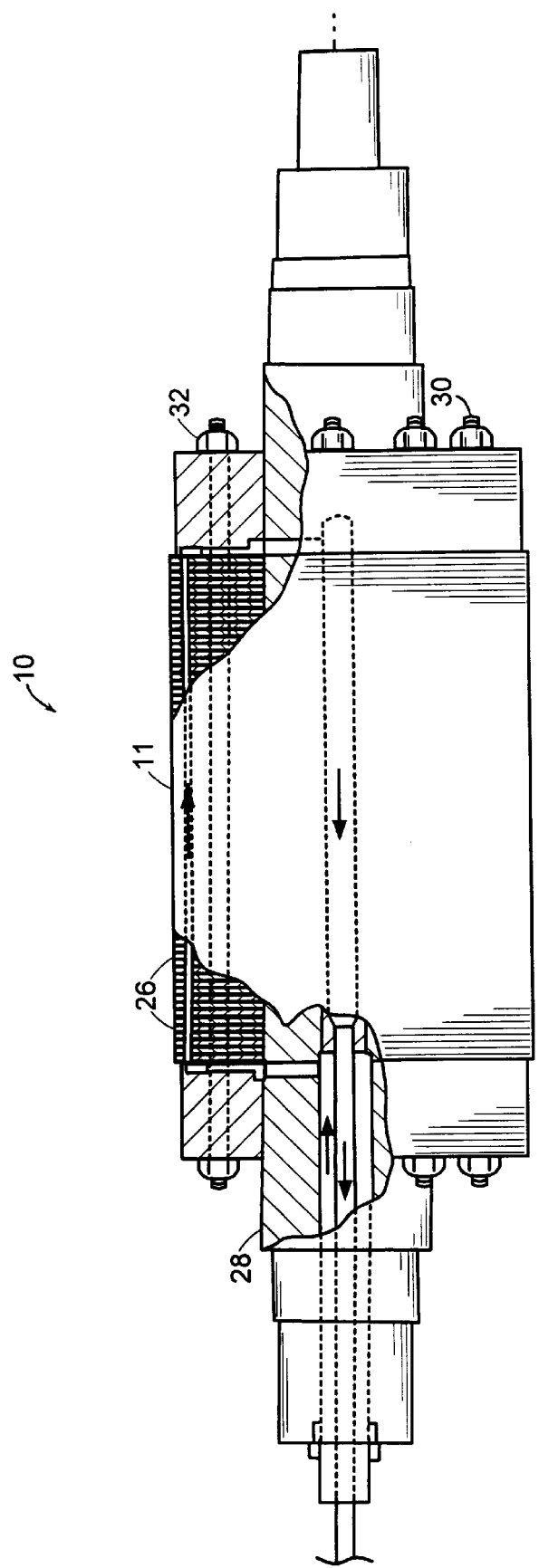
FIG. 2 is a fragmentary view, partially cut away of the mold roll.

Referring to FIG. 2, up to 2000 or more individual mold plates 26 of mold roll 10 are aligned and stacked axially on a common shaft 28. Plates 26 are held together under axial compression by an array of tie rods 30 that extend through aligned holes in the plates, parallel to shaft 28, and are tensioned by threaded nuts 32.

Figure 3:
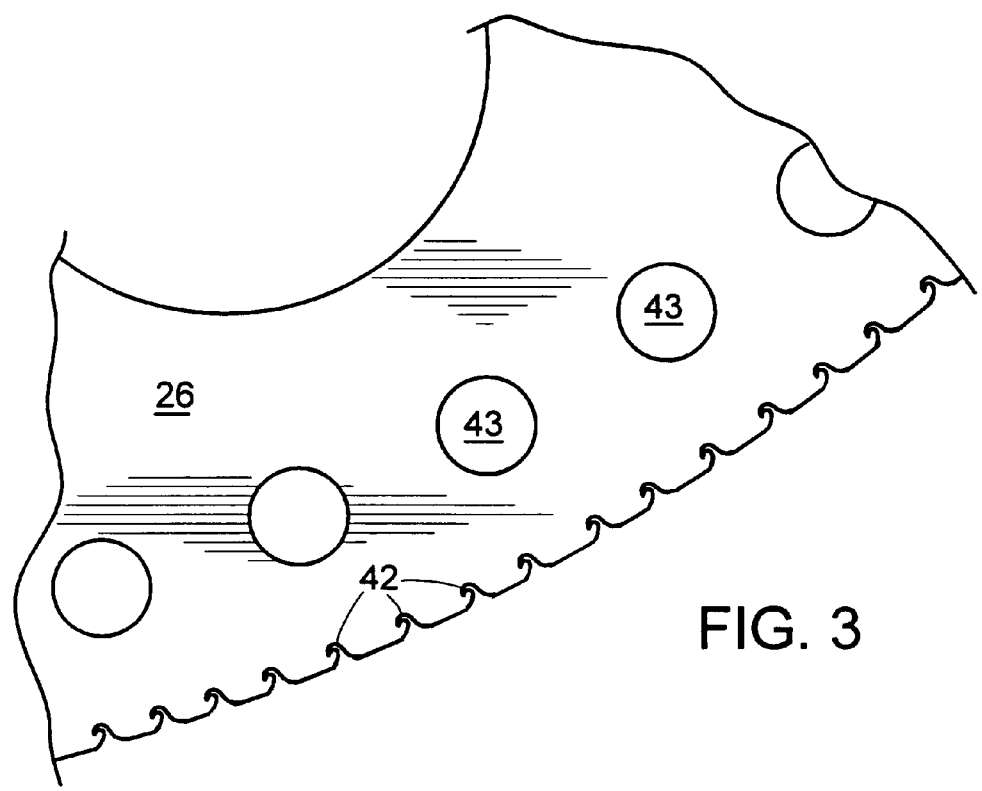
FIG. 3 is an enlarged view of a portion of a mold plate.
Figure 4A:
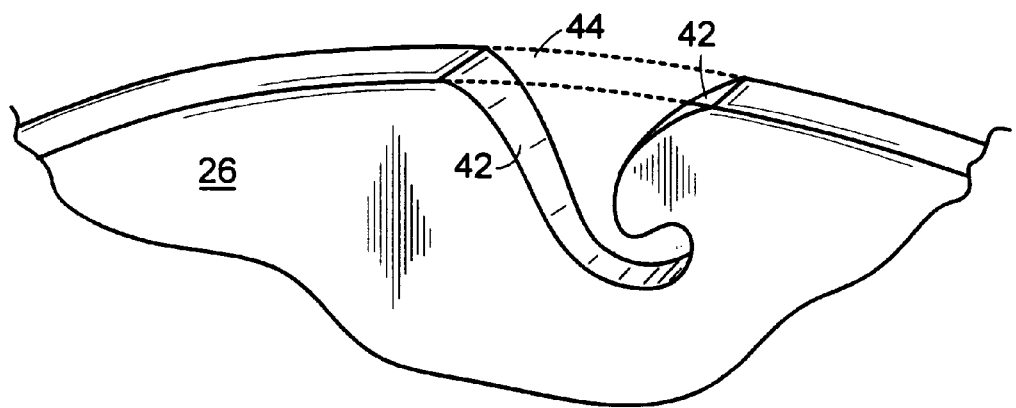
FIG. 4A is a close-up view of area 4 of FIG. 3.

Referring to FIGS. 3 and 4A, a section of a mold plate 26 has mold surfaces 42 formed at the periphery of the plate. Also shown in FIG. 3 are cooling holes 43 disposed near the periphery and extending through plate 26. Cooling holes 43 allow the passage of a coolant to keep the plates at a desired temperature. Mold surface 42 extends through the thickness of the mold plate 26, and, in combination with side surfaces of adjacent spacer plates, defines a fastener-shaped mold cavity 44. Cavities 44 are located at the peripheral surface of the assemble mold roll and are shaped to form fastener elements (for example, hooks) molded integrally with a base sheet of a fastener product in a continuous process.

Figure 5A:
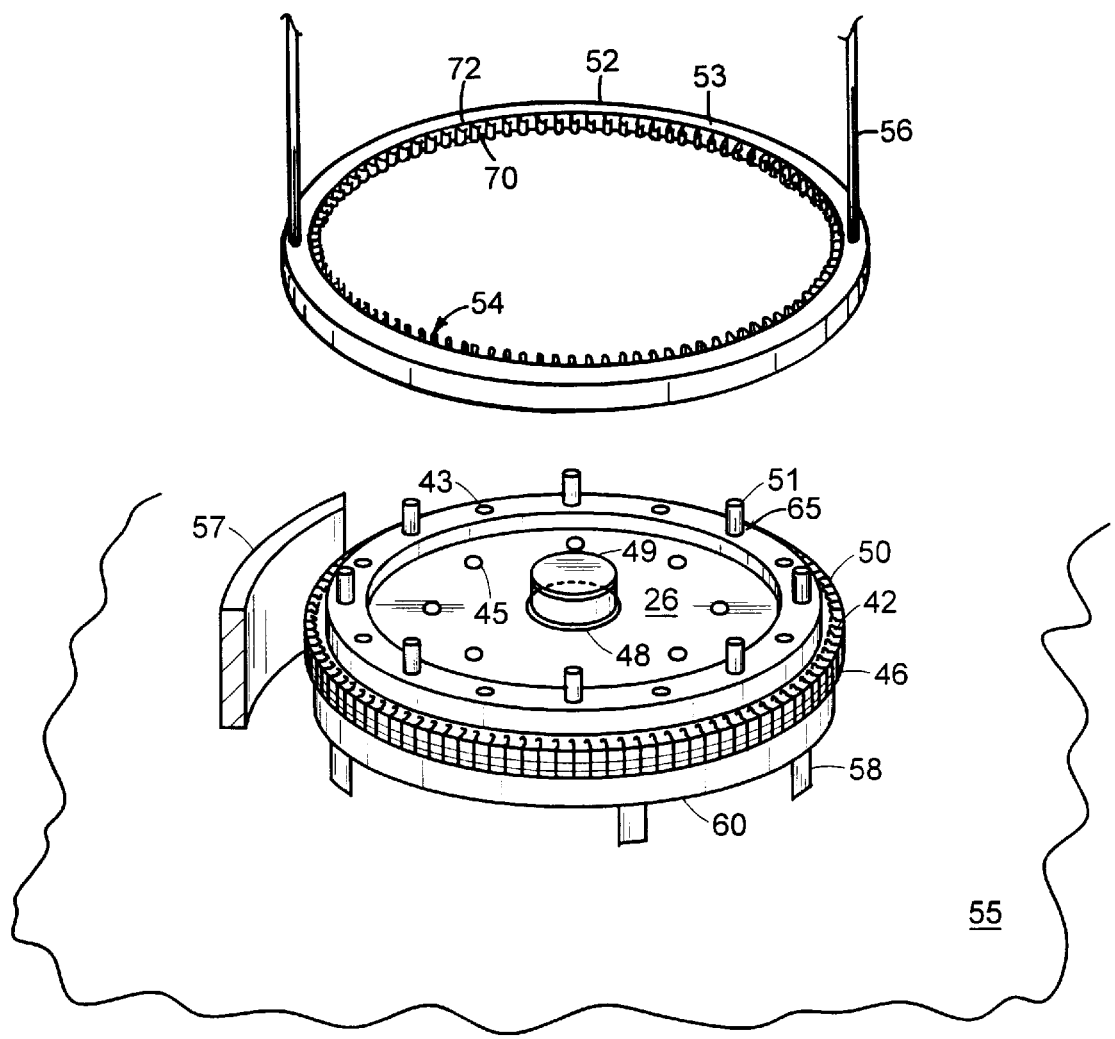
FIG. 5A is a schematic perspective view of an electro-discharge machining (EDM) method for mold plate manufacture.
Figure 5B:
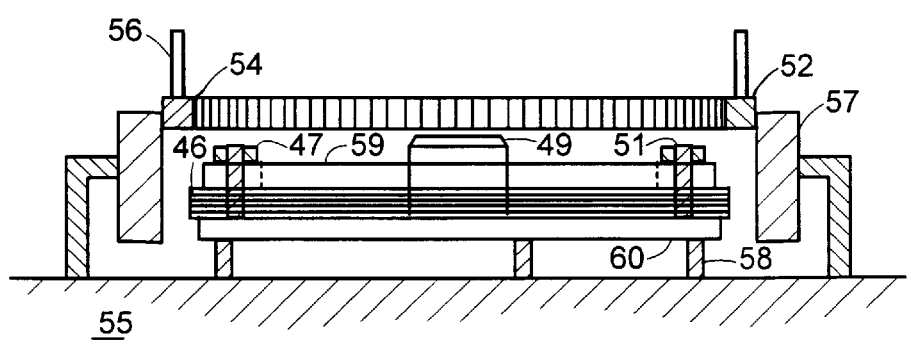
FIG. 5B is a side view of the EDM method illustrated in FIG. 5A.

FIGS. 5A and 5B illustrate an electro-discharge machining (EDM) process for forming a mold plate 26 and mold surfaces 42 around a outer edge 50 of the mold plate from a mold plate blank 46. Rather than forming each mold cavity surface one at a time by wire EDM method, all mold cavity surfaces are formed simultaneously. For example, at least 200 (preferably, at least 400) mold surfaces can be formed at once. To produce a finished mold plate, a set of metal mold plate blanks 46, each having a preformed inner diameter 48, outer diameter 50, alignment holes 45 and cooling holes 43 (shown by dashed lines), are stacked on surface 60, the stack of mold plates being about 0.5 inch in thickness. Attached to surface 60 are a pilot stem 49 and threaded stems 51 which are arranged so that pilot stem 49 extends through the center hole of each plate defined by inner diameter 48 and the threaded stems extend through every other cooling hole 43. To prevent any movement of the plates during the machining process, an annular ring 59 is placed on the stack of mold plates with stems 51 extending through holes 65 disposed within the ring. Ring 59 is secured to the plates by tightening nuts 47 (FIG. 5B) onto threaded stems 51. Support legs 58 are employed to raise surface 60 and hence the stack of mold plates from floor 55 to provide unobstructed passage of electrode 52 through the entire stack. The stack of mold plate blanks is presented to a cylindrical EDM electrode 52. Electrode 52, attached to support rods 56, is about 1 inch thick and has an inner diameter 53, a first opening 70, a second opening 72, and a plurality of fastener-shaped axial forming ribs 54 extending inwardly from inner diameter 53. To form the mold surfaces about the perimeter of the plate, electrode 52 is lowered along guide shafts 57 onto mold plate blank 46 such that an electric discharge between the blank 46 and ribs 54 removes material from the blank, simultaneously forming all of the mold surfaces 42 about the periphery of the plate. In some cases an electric discharge from electrode inner diameter 53 also removes blank 46 material to form the finished outer diameter of the plate. In another two-step process, cooling holes 43 are first formed by a conventual plunge EDM process which is then followed by the process described above. The electrode is typically made of graphite, but could also be made of other suitable materials such as copper. The forming ribs 54 are cut by conventional wire EDM machining methods.

Figure 6A:
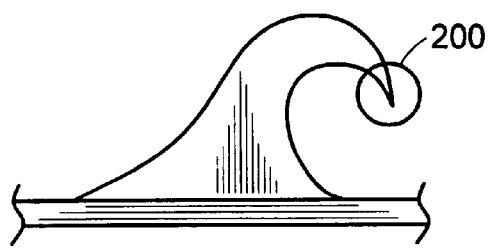
FIG. 6A is a side view of a molded fastener element.
Figure 6B:
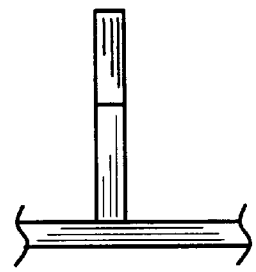
FIG. 6B is a front view of the fastener element of FIG. 6A.
Figure 6C:
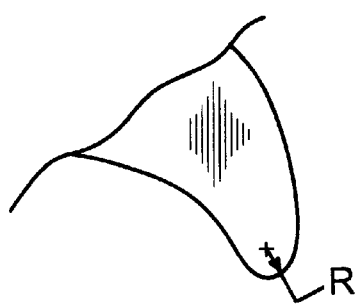
FIG. 6C is a close-up view of the area 200 of FIG. 6A.

A particular advantage of the present invention is that certain fastener element features formed with the mold surfaces produced by electrode 52 can be of smaller size than those formed with mold surfaces produced by conventional wire EDM methods. For instance, hook-shaped fastener elements with tips having radii, R, of about 0.001 inch or less (preferably only about 0.0005 inch), are readily produced in cavities formed by electrode 52, as shown in FIGS. 6A–6C. In wire EDM methods, the wire diameter determines the minimum achievable radius of internal cavity features. Furthermore, production rates of about two plates per hour can be produced by the method.

Figure 7:
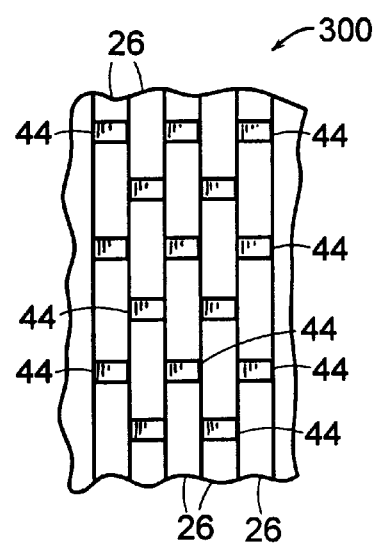
FIG. 7 is an enlarged view of a surface of a mold roll.

Referring to FIG. 7, plates produced as described in FIGS. 5A and 5B can be stacked to form a mold roll 300 without spacer plates, by preselecting the number and arrangement of the mold surfaces and cooling holes such that adjacent plates 26 may be rotationally indexed to align their cooling holes without overlapping any of their mold surfaces. The finished mold plates 26 are offset by a certain index so that a flat surface, spaced between consecutive mold surfaces, of one mold plate is aligned with a mold surface of an adjacent plate to define a mold cavity 44. Such mold rolls can thereby have about twice the number of mold cavities per square peripheral inch than mold rolls having spacer plates stacked alternating with finished mold plates.

Other embodiments are within the scope of the claims. For instance, a mold cavity for a given feature can be formed by accurately aligning cavity portions in two or more mold plates to form a single mold cavity. In other instances, mold surfaces that do not extend through the thickness of a mold plate are readily formed by arresting the advance of the electrode prior to burning completely through the plate. For some finished mold plates, the mold plates and mold surfaces around the periphery of each mold plate are fabricated in a sequential fashion. In some mold plates, mold surfaces are formed on both sides of the plates, the array of mold cavities on the two sides of a plate being circumferentially offset to avoid interference between mold cavities on mating. Mold surfaces can be formed along edges of any shape of mold plate by employing electrodes fashioned according to the shape of the edge of the plate.

In some cases, a two-step process is used to form the mold plates. In the first step, a worn electrode makes a rough cut of the mold surfaces 42 into the stack of mold plate blanks 46. In a second step, the finished mold surfaces are cut with a newer electrode.

What is claimed is:

1. A method of producing mold plates having series of mold surfaces formed at edges of the plates for molding a product having an array of fastener elements, the method comprising:

stacking flat, sheet-form blanks of plate material together to form a stack of blanks, each sheet-form blank of the stack having an exposed edge, providing an electrode having an exposed side surface with a multiplicity of longitudinal ribs extending therefrom, each longitudinal rib having a cross-sectional shape corresponding with the profile shape of a fastener element, and moving the electrode, in a direction parallel to its ribs and in the presence of a voltage differential between the electrode and the blank, along exposed edges of the stacked blanks such that the ribs of the electrode cause material to be removed from the blanks, by electro-discharge machining, to produce mold plates from the blanks, each mold plate having a series of fastener element-shaped mold surfaces extending inwardly from an outer edge of the plate.

2. The method of claim 1 wherein said electrode is cylindrical in shape, with ribs extending radially inward from an inner side surface of the electrode for forming mold surfaces in circular mold plates.

3. The method of claim 2 wherein the step of moving includes moving said electrode axially in coaxial relation with the axis of said plates.

4. The method of claim 2 wherein the side surface of the electrode is tapered from a first opening of said electrode to a second opening of said electrode, the first opening having a diameter larger than the diameter of said mold plates and the second opening having a diameter corresponding to the diameter of said mold plates.

5. The method of claim 1 wherein the step of moving the electrode simultaneously forms at least 200 mold surfaces at the outer edge of the mold plates.

6. The method of claim 5 wherein the step of moving the electrode simultaneously forms at least 400 mold surfaces at the outer edge of the mold plates.

7. The method of claim 1 wherein the thickness of a mold plate, as formed, is less than about 0.020 inch.

8. The method of claim 1 wherein the mold surfaces define distal features having end radii (R) of less than about 0.001 inch.

9. The method of claim 8 wherein the mold surfaces define distal end features having an end radii (R) of less than about 0.0005 inch.

10. The method of claim 1 wherein the step of moving the electrode forms alignment features in the mold plates, to align the mold surfaces of adjacent plates in a stack.

11. The method of claim 10 wherein the alignment features are non-circular.

12. The method of claim 1 further comprising:

passing a first electrode through the sheet-form blanks to rough-cut said mold plates; and passing a second electrode through said rough-cut mold plates to finish-cut said mold plates and said fastener element-shaped mold surfaces.

13. The method of claim 1 wherein moving the electrode along the stacked blanks forms an array of cooling holes in the mold plates.

14. A method of producing a circular mold plate having a series of mold surfaces formed in and spaced around its peripheral edge for molding a fastener product having an array of fastener elements, the method comprising:

providing a flat, circular, sheet-form blank of plate material having an exposed edge, providing a cylindrical electrode having a series of longitudinal ribs spaced about and extending inwardly from an inner bore of the electrode, each longitudinal rib having a cross-sectional shape corresponding with the profile shape of a fastener element, and moving the electrode, axially in the presence of a voltage differential between the electrode and the blank, along the exposed edge of the blank such that the ribs of the electrode cause material to be removed from the outer edge of the blank, by electro-discharge machining, to produce a mold plate from the blank, the mold plate having a series of fastener element-shaped mold surfaces extending inwardly from its peripheral edge.

15. The method of claim 14 wherein said mold surfaces, as formed, extend through the thickness of the mold plate.

16. The method of claim 14 wherein said mold surfaces are formed on one side of the mold plate, and do not extend through the thickness of the mold plate.

17. The method of claim 14 including stacking at least two blanks to form a blank stack and simultaneously forming mold surfaces in all of the blanks in the stack.

18. The method of claim 14 including simultaneously forming at least 200 mold surfaces at the peripheral edge of the mold plate.

19. The method of claim 18 including simultaneously forming at least 400 mold surfaces at the peripheral edge of the mold plate.

20. The method of claim 14 wherein the thickness of the mold plate, as formed, is less than about 0.020 inch.

21. The method of claim 14 wherein the mold surfaces define distal features having end radii (R) of less than about 0.001 inch.

22. The method of claim 21 wherein the mold surfaces define distal features having end radii (R) of less than about 0.0005 inch.

* * * * *